United States Patent [19]

Hutterer et al.

[11] Patent Number: 4,626,937

[45] Date of Patent: Dec. 2, 1986

[54] MAGNETIC-TAPE APPARATUS HAVING A DISC WITH TWO CONTROL SURFACES

[75] Inventors: Heribert Hutterer; Johann Veigl, both of Vienna, Austria

[73] Assignee: U.S. Philips Corporation, New York, N.Y.

[21] Appl. No.: 656,102

[22] Filed: Sep. 28, 1984

[30] Foreign Application Priority Data

Sep. 29, 1983 [AT] Austria ................................. 3464/83

[51] Int. Cl.$^4$ ...................... G11B 5/008; G11B 15/00; G11B 15/44

[52] U.S. Cl. ...................................... 360/90; 360/137; 360/74.1; 360/93

[58] Field of Search ..................... 360/61, 62, 71, 74.1, 360/90, 93, 96.1, 96.3, 105, 137; 242/197–201, 204, 208

[56] References Cited

U.S. PATENT DOCUMENTS

| | | | |
|---|---|---|---|
| 4,404,610 | 9/1983 | Koizumi et al. | 360/137 |
| 4,495,535 | 1/1985 | Kohri et al. | 360/96.3 |
| 4,499,513 | 2/1985 | Umeda | 360/96.3 |
| 4,507,694 | 3/1985 | Hosono et al. | 360/90 |

FOREIGN PATENT DOCUMENTS

| | | | |
|---|---|---|---|
| 55-97044 | 7/1980 | Japan | 360/105 |
| 56-77937 | 6/1981 | Japan | 360/105 |
| 57-127950 | 8/1982 | Japan | 360/61 |

*Primary Examiner*—Stuart N. Hecker
*Assistant Examiner*—Benjamin E. Urcia
*Attorney, Agent, or Firm*—David R. Treacy

[57] ABSTRACT

A magnetic-tape apparatus (1) comprises at least two buttons (9, 10, 11) for selecting modes of operation of the apparatus and at least one apparatus part (37) to be positioned in conformity with the modes selected by actuation of the button. For positioning the apparatus part (37) the apparatus comprises a servo mechanism (50) which can be driven by a motor (27), which mechanism comprises a first eccentric means (71) arranged on a servo wheel (52), a drive member (73) which is movable by this eccentric means (71), and an actuating member (85) which is movable by the drive member (73) for positioning the apparatus part (37). Depending on the selected mode of operation, the actuating member (85) can be set to different positions defined by stops (20, 21 23) associated with the buttons (9, 10, 11) by means of a control device (86) which comprises a second eccentric means (87) which can be driven by the motor (27) and at least one scanning element (89, 90, 91) for scanning the stops (20, 21, 23) associated with the buttons (9, 10, 11), which cooperates with the actuating member (85) and which moves this member to the various positions. The servo disc (52) comprises a disc-shaped axially projecting portion (58) on one of its radial surfaces, which portion carries a circumferential cam (87). The cam (87) constitutes the second eccentric means and in the disc-shaped portion (88) at the deck side a groove (71) is formed which constitutes the first eccentric means.

3 Claims, 4 Drawing Figures

MAGNETIC-TAPE APPARATUS HAVING A DISC WITH TWO CONTROL SURFACES

BACKGROUND OF THE INVENTION

1. Field of the Invention

The invention relates to a magnetic-tape apparatus comprising at least two manually operable push-buttons for selecting modes of operation of the apparatus, each button being associated with a stop defining the mode of operation selected by actuation of the button. A servo-mechanism which is put into operation by actuating a button positions at least one apparatus part in conformity with the selected mode.

The mechanism comprises a servo disc which can be driven by a motor and which can be made to rotate upon actuation of a button, a first eccentric means arranged on the servo disc, a drive member movable by said eccentric means, and an actuating member which is movable by the drive member to position the apparatus part. The actuating member can be set to different operating positions, defined by the stops associated with the buttons, by a control device which can be put into operation upon actuation of a button.

The control device comprises a second eccentric means which can be driven by the motor, and at least one scanning element for scanning the stops. The scanning element cooperates with the second eccentric means and with the actuating member, and can be released by the second eccentric means to scan the stops. In order to scan a stop after the scanning element has been released, it can be positioned against the stop which defines the selected mode under the influence of at least one spring, actuation of a button firstly causing the second eccentric means to release the scanning element in order to scan the stops, so that the spring urges the scanning element against the stop which defines the selected mode and the scanning element moves the actuating member to the position defined by the stop corresponding to the selected mode. Then the first eccentric means moves the drive member, which drive member moves the actuating member, and the actuating member positions the apparatus part.

2. Description of the Prior Art

Such apparatus is disclosed in, for example, German Offenlegungsschrift No. 28 50 239 to which U.S. Pat. No. 4,225,894 corresponds. In the known apparatus the control device for controlling the positions of the actuating member comprises a control disc which can be driven by a separate motor and which carries the second eccentric means which cooperates with the scanning element. Such a separate control disc results in additional cost, demands additional space and also complicates assembly of the apparatus, because the position of the control disc and the servo disc relative to each other must be defined accurately to ensure a correct coordination of the movements initiated by the two discs via the eccentric means.

Further, from German Offenlegungsschrift No. 19 46 150 it is known to provide a plurality of eccentric means on a radial surface of a servo disc in order to obtain coordinated movements of apparatus parts. However, these eccentric means are superimposed relative to the radial surface, so that the thickness of the servo disc and hence the height of the apparatus become comparatively large.

SUMMARY OF THE INVENTION

The invention aims at simplifying the construction of an apparatus of the type defined in the opening paragraph, mitigating the aforementioned problems and providing an apparatus of minimal height.

To this end the invention is characterized in that a radial surface of the servo disc carries a disc-shaped axially projecting portion provided with a circumferential cam which constitutes the second eccentric means. At its deck side the disc-shaped axially projecting portion is formed with an endless groove which constitutes the first eccentric means. Since the two eccentric means are both situated on one side of the servo disc the two eccentric means are disposed at substantially the same level, thus enabling thickness of the servo disc and hence the height of the apparatus to be minimized. Since the second eccentric means, which serves to release the scanning element, is constituted by the cam on the circumference of the disc-shaped axial projection, in a simple manner the scanning element is kept entirely clear of the servo disc after the scanning element has been released by the cam, so that it can freely follow the movements of the actuating member which is moved by the drive member to which the actuating member is coupled. Moreover, since the first eccentric means, which serves for moving the drive member, is constituted by the groove in the disc-shaped projection at the deck side, this has the advantage that the drive member is moved in both directions in a positive and hence reliable manner, which also guarantees that the apparatus part is positioned correctly by the drive member, enabling the radial distance of the groove from the center of the servo disc to be minimized. This short radius is advantageous in order to minimize the influence of friction on the force transmission between the groove and the drive member which is movable by means of this groove, resulting in a smooth and correct displacement of the drive member, the actuating member and the apparatus part.

The apparatus parts which can be moved by means of the groove and the cam, i.e. the drive member, the actuating member and the scanning element, may comprise, for example, slides which move comparatively heavily. Since the servo disc in accordance with the invention carries both the groove and the cam it is effective to minimize the forces to which the servo disc is subjected by the apparatus parts which can be moved by means of the groove and the cam. In this respect it is found to be advantageous if the drive member which is movable by means of the groove is constituted by a pivotable drive lever which comprises a projection which engages the groove, and there is provided a translatable and pivotable shift lever which comprises a further projection which cooperates with the cam under the influence of a spring which acts on said shift lever, at least one laterally projecting tab which constitutes the scanning element for scanning the stops, and a portion which is situated between the drive lever and the apparatus part to be positioned, and which constitutes the actuating member. This results in an arrangement which comprises very small number of parts which are readily movable because of the lever construction, which has the advantage that the servo disc, by means of which the drive lever and the apparatus parts to be driven by the drive lever as well as the shift lever must be moved, is subjected to minimal forces.

Further, it is found to be advantageous if the shift lever comprises a separate laterally projecting tab for scanning each stop. Thus, each stop has an associated tab, so that by a suitable choice of the position of each tab relative to the position of the corresponding stop, that portion of the shift lever which constitutes the actuating member can be given almost any desired which position is defined by a stop. The positions of the stops can be selected for convenience in other aspects of the construction. Thus, the various positions of the shift-lever portion constituting the actuating member, which positions are defined by the stops associated with the buttons, can be adapted simply to the predetermined positions of the stops.

Embodiments of the invention will be described in more detail, by way of example, with reference to the drawings.

DESCRIPTION OF THE PREFERRED EMBODIMENT

Figure 1:
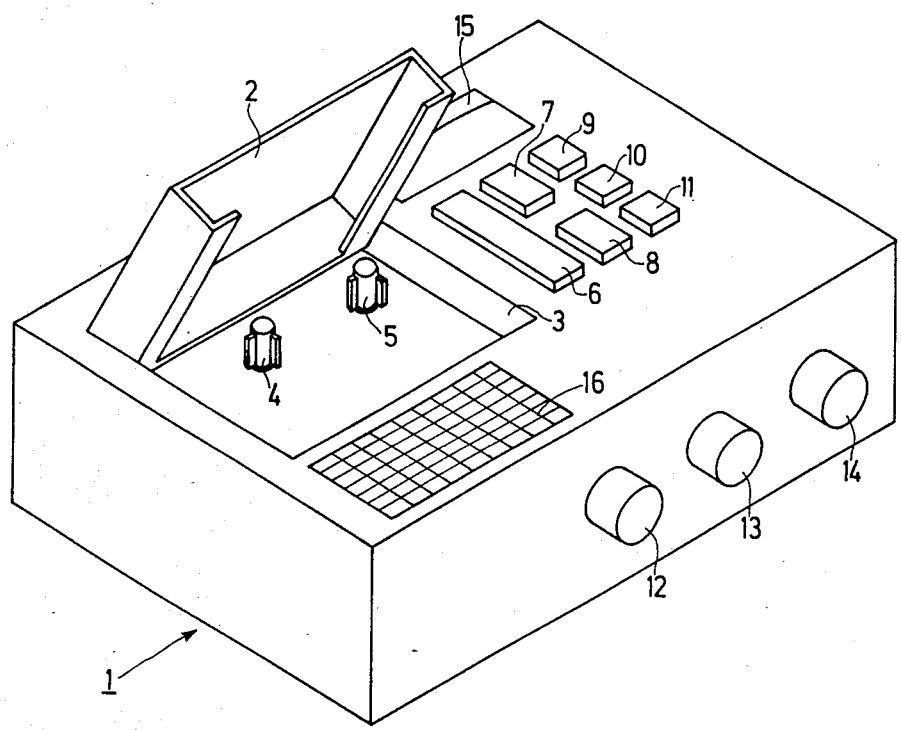
FIG. 1 is a diagrammatic perspective view of a magnetic-tape-cassette apparatus for recording and reproducing audio signals on/from a magnetic-tape accommodated in a cassette, in which the invention may be incorporated, the apparatus being shown with the cassette holder in the swung-open position.

The magnetic-tape-cassette apparatus 1 shown schematically in FIG. 1 comprises a pivotable cassette holder 2 which can hold a magnetic-tape cassette, which is not shown in FIG. 1 and which comprises two magnetic-tape reels arranged side by side, which holder can be swung into a recess 3 in the apparatus. When the holder is swung down two winding spindles 4 and 5 cooperate with the magnetic-tape reels of a magnetic-tape cassette contained in the cassette holder. By means of the two winding spindles 4 and 5 the two magnetic tape reels can be rotated in order to wind the magnetic tape onto one of the magnetic-tape reels depending on the direction of rotation of the winding spindles.

The apparatus 1 in FIG. 1 comprises six push-buttons 6, 7, 8, 9, 10 and 11 which can each be set to an off-position and an on-position for selecting the modes of operation of the apparatus, three knobs 12, 13 and 14 for the operation of rotary controls, a recording-level indicator 15 and a grille 16 which covers a loudspeaker. The knob 12 operates a volume control for manually adjusting the volume of an audio signal to be reproduced, the knob 13 operates a frequency-response control for manually influencing the frequency response of an audio signal to be reproduced, and the knob 14 operates a recording-level control for adjusting of the amplitude of an audio signal to be recorded.

The push-button 6 serves for selecting the "stop" mode in which the magnetic tape is stationary and in which the magnetic heads and a pressure roller are lifted off the magnetic tape. The heads and pressure roller are arranged on a so-called head mounting plate, which is movable into a position in which the roller presses the tape against a speed-control capstan and the heads contact the tape. The push-button 7 serves for selecting the "record" mode in which the magnetic heads and the pressure roller cooperate with the magnetic tape and the tape is driven with a predetermined constant speed by the capstan to record audio signals on the magnetic tape by means of a magnetic recording head. The push-button 8 serves for selecting the "play" mode in which, in the same way as in the "record" mode, the magnetic head and the pressure roller cooperate with a magnetic tape so that the magnetic tape is driven with the same predetermined speed as in the "record" mode to reproduce the audio signals stored on the magnetic tape by means of a magnetic play-back head. The push-button 9 serves for selecting the "fast forward" mode in which the magnetic heads and the pressure roller are lifted off the magnetic tape and the magnetic tape is wound rapidly onto the magnetic-tape reel which cooperates with the winding spindle 5. The push-button 10 serves for selecting the "fast reverse" mode in which the magnetic heads and the pressure roller are also lifted off the magnetic tape and the magnetic tape is wound rapidly onto the magnetic tape reel which cooperates with the winding spindle 4. The push-button 11 serves for selecting the "pause" mode, in which a mode which has been selected previously by means of the buttons 7, 8, 9, and 10 can be interrupted by actuating this button, which mode can be restored by again actuating this button. It is to be noted that, apart from the push-button 6 for the "stop" mode, all the other push-buttons 7, 8, 9, 10 and 11 are of the latching type, which are retained automatically in their actuated positions by means of a latching device. In the customary manner the latching device for the push-buttons may comprise a latching bar, which is not shown for the sake of simplicity because it is irrelevant to the present invention.

Figure 2:
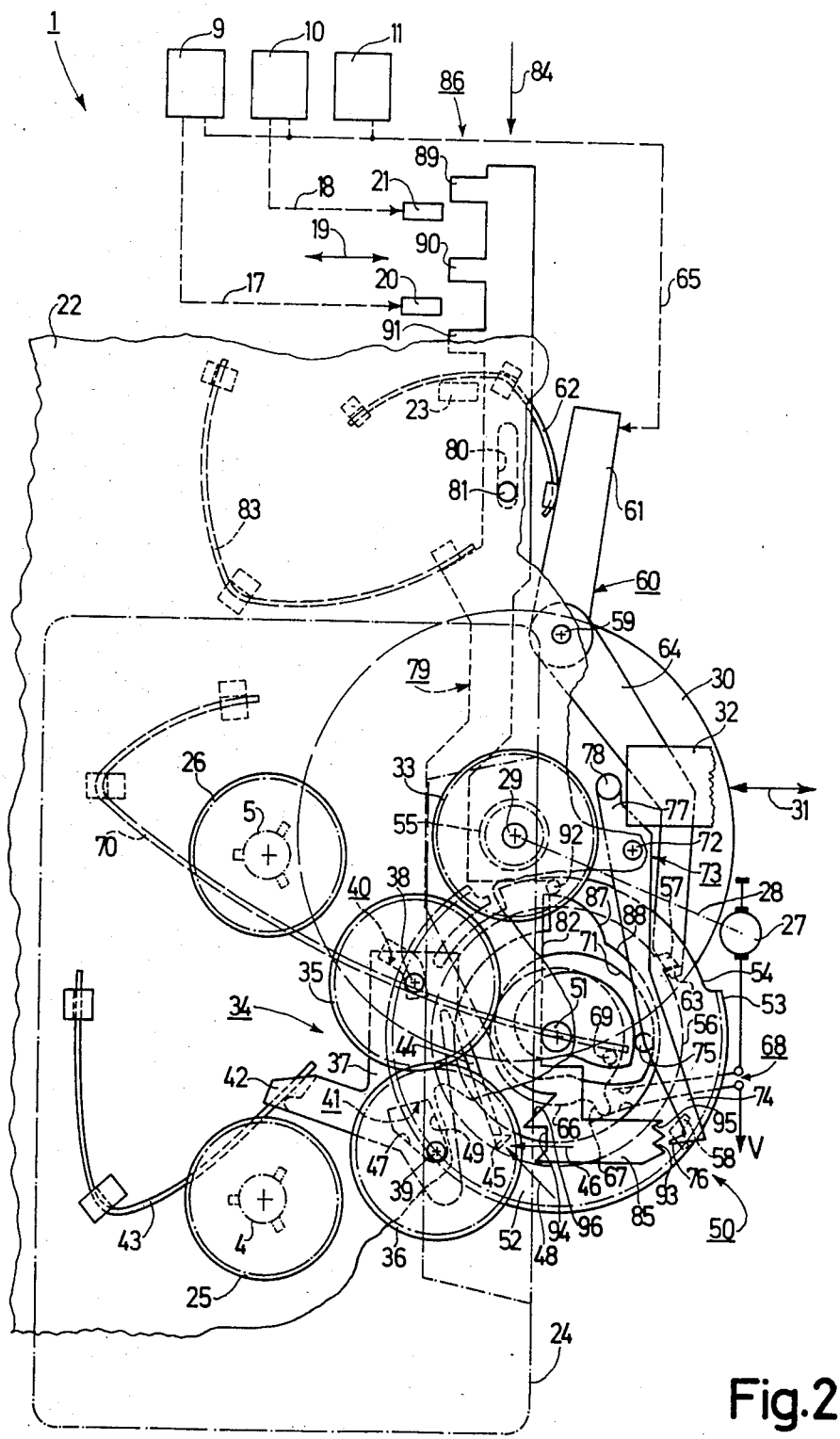
FIG. 2 shows schematically relevant parts of the apparatus shown in FIG. 1, all the apparatus parts being in their rest positions because the apparatus has not been set to any mode of operation.
Figure 3:
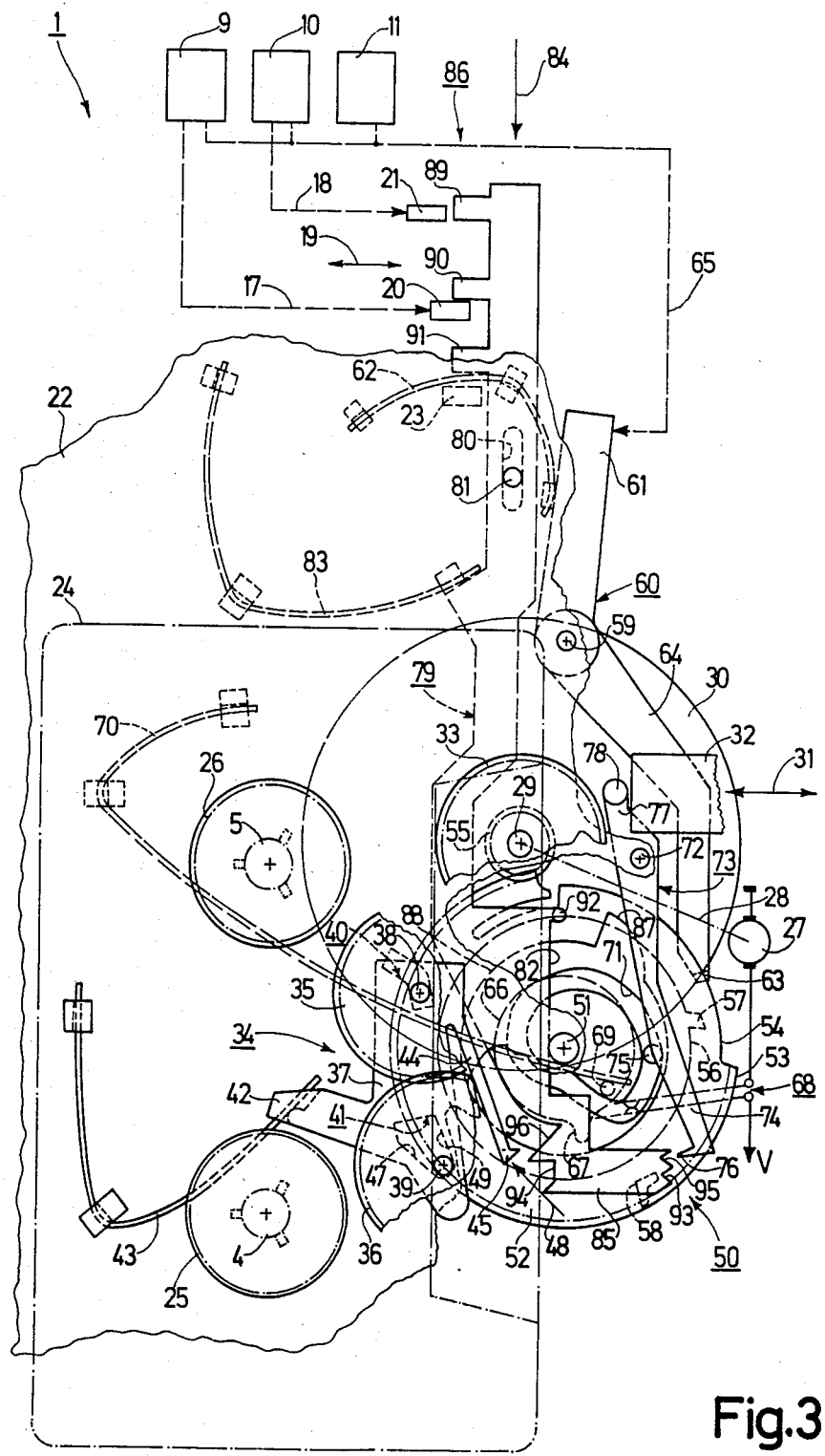
FIG. 3 shows is a view of the same parts of the apparatus as shown in FIG. 2, the apparatus parts being shown in the positions which they occupy briefly after actuation of a button for selecting the "fast forward" mode.
Figure 4:
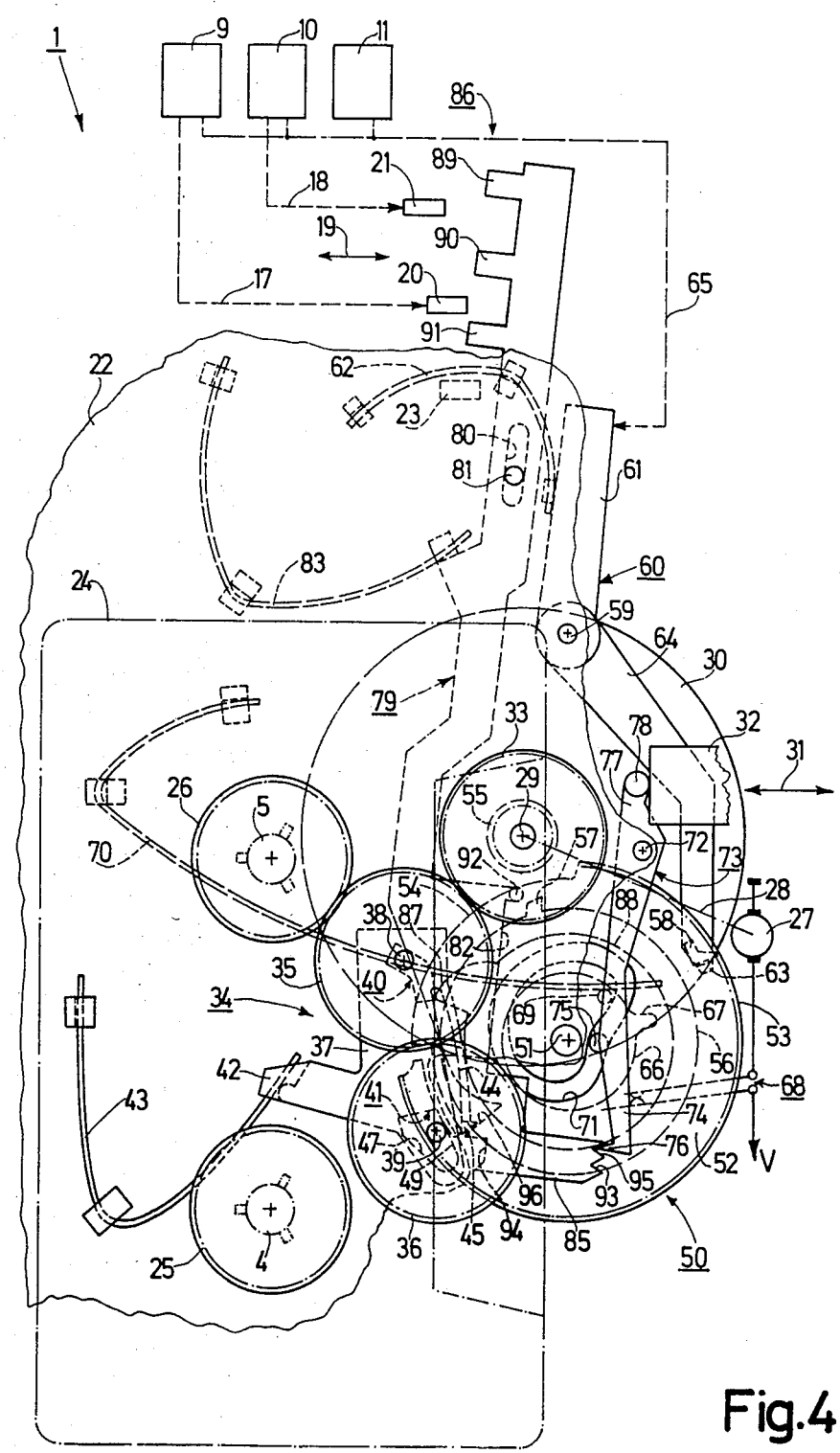
FIG. 4 shows the same parts of the apparatus as FIGS. 2 and 3, the apparatus parts being shown in the positions which they occupy in the "fast forward" mode.

Hereinafter, that part of the apparatus 1 of FIG. 1 by means of which the "fast forward", "fast reverse", and "pause" modes can be selected and carried out will be described with reference to FIGS. 2, 3 and 4. FIGS. 2, 3 and 4 show the latching-type push-buttons 9, 10 and 11 for selecting the three aforementioned modes of operation. Each of these push-buttons 9, 10 and 11 has an associated stop which defines the mode selected by actuation of a button. In the present case the stops associated with the push-buttons 9 and 10 are constituted by slides 20 and 21 which are movable in the direction indicated by the double arrow 19 by the push-buttons 9 and 10 via the couplings 17 and 18 represented symbolically by broken lines, and which can be moved between a rest position shown in FIG. 2 and a detection position, the slide 20 being shown in the latter position in FIGS. 3 and 4. In their detection positions in which they define the mode of operation selected by actuation of the relevant buttons, the slides 20 and 21 are retained by the push-buttons 9 and 10 respectively, when the push-buttons are latched in their on-positions. The couplings 17 and 18 may comprise, for example, pivotal levers which are movable by the push-buttons 9 and 10 and which cooperate with the slides 20 and 21, which levers are pivotally connected to the slides and are movable against spring force when the buttons are actuated. The push-button 11 has an associated stop in the form of a stationary stop block 23 arranged on a mounting plate 22, shown partly in FIGS. 2, 3 and 4. The stops 20, 21 and 23 serve to signal inside the apparatus which mode has been selected by means of the relevant push-button, as will be described in more detail hereinafter.

For the sake of clarity a magnetic tape cassette 24 which has been inserted into the apparatus 1 and the winding spindles 4 and 5, which serve for driving the magnetic tape reels, in the cassette, are represented schematically by the dash-dot lines in FIGS. 2, 3 and 4. For driving the winding spindles 4 and 5 each spindle is coupled to a coaxial drive gear 25 and 26, respectively. The drive gears 25 and 26 are mounted for rotation on a mounting plate and are arranged above the mounting plate, as is shown in FIGS. 2, 3 and 4.

For driving the gear wheels 25 and 26 the apparatus 1 comprises a motor 27 which drives a capstan 29 through a coupling represented schematically by a dash-dot line 28. The captan 29 is mounted for rotation in and extends through the mounting plate 22, is rigidly connected to a coaxial flywheel 30 arranged beneath the mounting plate. The capstan 29 serves for driving the magnetic tape contained in the cassette 24 with a predetermined constant speed in the "record" and "playback" modes in which the magnetic tape is pressed against the capstan 29 by means of a pressure roller. The pressure roller and the magnetic heads for scanning the magnetic tape are arranged on a head-mounting plate in a manner which, for the sake of clarity, is not shown in FIGS. 2, 3 and 4. The head-mounting plate can be moved towards and away from the cassette in the directions indicated by the double-headed arrow 31, the movement of this plate away from the cassette being effected by means of a head-mounting plate actuating slide 32 which is movably guided in the direction indicated by the arrow 31. The movement of the head-mounting plate towards the cassette is effected by means of the push-buttons 7 and 8 for selecting the "record" and "playback" modes through a separate mechanism. The coupling 28 between the motor 27 and the capstan 29 may be a belt which is passed over a drive wheel of the motor and the flywheel. In the case of a so-called direct drive of the capstan 29 the coupling 28 is constituted by the motor shaft itself.

Above the mounting plate 22 a gear wheel 33 by means of which a pair 34 of gear wheels can be driven is rigidly connected to the capstan 29. The gear-wheel pair 34 comprises two gear wheels 35 and 36 which are constantly in mesh with each other, which are mounted for rotation on shafts 38 and 39 respectively, arranged on a plate-shaped support 37 above the mounting plate so as to be movable parallel to the mounting plate 22 and which serve for driving the gear wheels 25 and 26 which are coaxial with the winding spindles 4 and 5. The spindles 38 and 39 each extend through openings 40 and 41, respetively in the mounting plate 22, the bounding walls of these openings defining a rest position for the support 37, shown in FIGS. 2 and 3, and two operating positions of the support 37, of which one position is shown in FIG. 4. The opening 40 is formed so that it guides the spindle 38 of the gear wheel 35 along a path corresponding to the shape of the opening. The opening 41 enables the spindle 39 of the gear wheel 36 to be moved along two different paths, as will be explained hereinafter.

A first wire spring 43 which acts on the mounting plate 22 cooperates with the bifurcate end portion of an arm 42 of the support 37 and urges the support 37 into its rest position which is shown in FIGS. 2 and 3 and which is defined by the cooperation of the spindles 38 and 39 with the bounding walls of the openings 40 and 41. In the rest position the gear wheels 38 and 36 on the support 37 are not in mesh with the gear wheel 33 and the gear wheels 25 and 26. Further the support 37 comprises an elastic actuating arm 44, whose right-angled free end portion 45 of triangular cross-section extends through an opening, not shown, in the mounting plate 22 in order to take up a force with which the support 37 is moved.

If an actuating force which is directed substantially as indicated by the arrow 46 is exerted on the free end portion 45 of the actuating arm 44, the spindle 39 of the gear wheel 36 slides along the bounding wall 47 of the opening 41, the spindle 38 of the gear wheel 35 then being guided by the opening 40. As a result of this, the support 37 is moved against the force exerted by the first wire spring 43 in such a way that the gear wheel 35 of the gear-wheel pair 34 meshes with the gear wheel 33 which is coaxial with the capstan 29 and the gear wheel 36 of the gear-wheel pair 34 meshes with the gear wheel 25 which is coaxial with the winding spindle 4. In this operating position of the support 37 the winding spindle 4 can be driven by the motor 27 through the coupling 28, the capstan 29, the gear wheel 33, the gear wheel 35, the gear wheel 36 and the gear wheel 25, which corresponds to the situation in the "fast reverse" mode. If an actuating force which is directed substantially as indicated by the arrow 48 is exerted on the free end portion of the actuating arm 44, the first wire spring 43, which simultaneously acts on the support 37, causes the spindle 39 of the gear wheel 36 to slide along the bounding wall 49 of the opening 41, the spindle 38 of the gear wheel 35 then being guided by the opening 40. As a result of this, the support 37 is moved against the force exerted by the first wire spring 43 in such a way that the gear wheel 35 of the gear-wheel pair 34 meshes both with the gear wheel 33, which is coaxial with the capstan 29, and with the gear wheel 26 which is coaxial with the winding spindle 5, the gear wheel 36 of the gear wheel pair 34 remaining disengaged from the gear wheel 25 which is coaxial with the winding spindle 4. In this operating position of the support 37 the winding spindle 5 can be driven by the motor 27 through the coupling 28, the capstan 29, the gear wheel 33, the gear wheel 35 and the gear wheel 26, which corresponds to the situation in the "fast forward" mode. If no actuating force is exerted on the free end portion 45 of the actuating arm 45, the support 37 remains in its rest position shown in FIGS. 2 and 3. This is obvious but it has been mentioned only because it corresponds to the situation after actuation of the push-button for the "pause" mode.

As is evident from the foregoing description, the support 37 carrying the gear-wheel pair 34 constitutes an apparatus part which can be positioned differently depending on the selected mode of operation. For moving the support 37 the apparatus 1 comprises a motor-driven servo mechanism 50 which can be rendered operative by actuating one of the three push-buttons 9, 10 and 11 and which provides the actuating forces for moving the support 37. The use of such a servo mechanism enables the actuating forces for the push-buttons to be very small, resulting in a simple and smooth operation of the buttons. The servo mechanism 50 comprises a servo disc 52 which is arranged beneath the mounting plate 22 as shown in FIGS. 2, 3 and 4 and which is mounted for rotation on the mounting plate 22 by means of a spindle 51. The circumference of the disc is provided with a toothed portion 53 and a non-toothed portion 54 adjoining the portion 53. For driving the servo disc 52 a pinion 55 is rigidly connected to the capstan 29 beneath the mounting plate 22, so that this pinion can be driven together with a capstan 29 by the motor 27 of the apparatus through the coupling 28.

In the present example the servo disc 52 can be stopped in two positions, namely in a rest position shown in FIG. 2 and in an operating position shown in FIG. 4. For this purpose the radial surface of the servo disc 52 which is remote from the mounting plate 22 carries an axially projecting disc-shaped circularly cylindrical portion 56 from which a circumferential first latching stop 57 projects in a radial direction. Further, the lower radial surface of the servo disc 52 carries an axially projecting second latching stop 58, whose radial distance from the center of the servo wheel is larger than that of the first latching stop 57. In order to cooperate with the two latching stops 57 and 58 there is provided a latching lever 60 which is pivotable about a spindle 59 mounted in the mounting plate 22, which is arranged beneath the mounting plate and which is movable between a first and a second latching position. A second wire spring 62 which bears against the mounting plate 22 acts on a first arm 61 of the latching lever 60 and urges the latching lever 60 into its first latching position shown in FIG. 2, in which position the free end 63 of the second arm 64 of the latching lever 60, which end is bent upwardly towards the mounting plate, is urged against the cylindrical portion 56 under the influence of the second wire spring 62 and can cooperate with the first latching stop 57. By actuating one of the three push-buttons 9, 10 and 11 the latching lever 60 is movable to its second latching position shown in FIGS. 3 and 4 against the force of the second wire spring 62 through a coupling 65 which is represented symbolically by a broken line and which cooperates with the first arm 61 of the latching lever 60, in which second latching position the latching lever is kept in the pivoted position through the coupling 65 by the push-button which is latched in the actuated position and can cooperate with the second latching stop 58. The coupling 65 may be, for example, a lever mechanism which can be actuated by any of the push-buttons 9, 10 and 11.

On its lower radial surface which is remote from the mounting plate 22 the servo disc 52 carries a further disc-shaped circularly cylindrical portion 66 which projects from the cylindrical projection 56 in the axial direction and which carries a radially projecting hump-like switching cam on its circumference. The switching cam serves to cooperate with an electrical switch 68, shown schematically, which switch is kept open by the switching cam in the rest position of the servo disc 52 shown in FIG. 2 and thereby interrupts a supply voltage V to the motor 27 and which is released by the switching cam 67 and is consequently closed, thereby applying the supply voltage V to the motor 27, in all the other positions of the servo disc 52.

The further cylindrical portion 66 on the lower radial surface on the servo disc 52 which is remote from the mounting plate 22 carries an axially projecting pin 69 against which a third wire spring 70 acts, which spring bears on the mounting plate 22 and performs several functions. The third wire spring 70 retains the servo disc 52 in its rest position through the pin 69, by urging the first latching stop 57 against the angular free end portion 63 of the latching lever 60, which is in its first latching position. After the latching lever 60 has been pivoted into its second latching position via the coupling 65 upon actuation of one of the three push-buttons 9, 10 and 11 in which position the angular end portion 63 of the latching lever 60 is disengaged from the first latching stop 57, the third wire spring 70 imparts a mechanical impulse to the servo disc 52 through the pin 69. In this way the servo disc is rotated clockwise upon actuation of a button, so that the teeth on the circumferential portion 53 mesh with the pinion 55 on the capstan 29. Further, through the pin 69, the third wire spring 70 causes the servo disc 52 to move to and to be retained in the operating position shown in FIG. 4 when the pinion 55 has disengaged from the toothed portion 53 upon rotation of said disc, and causes the second latching stop to be urged against the angular free end portion 63 of the latching lever 60, which is then in its second latching position. Finally, through the pin 69, the third wire spring 70 causes the servo disc 52 to rotate from its operating position shown in FIG. 4 to the rest position shown in FIG. 2 when the latching lever 60 has been moved from its second latching position to its first latching position, which happens when the actuated push-button, which is latched in its actuated position, is reset to its off-position.

The servo mechanism 50 for moving the support 37 comprises a first eccentric means on the servo disc 52. This eccentric means is constituted by an endless groove 71 which is formed in the upper radial surface of the servo disc, which surface faces the mounting plate 22, and whose shape is such that its radial distance from the center of the servo disc varies. Further, the servo mechanism 50 comprises a drive member which is movable by the first eccentric means. This drive member is constituted by a drive lever 73 which is pivotable about a spindle 72 journalled in the mounting plate 22 and which is arranged opposite the upper radial surface of the servo disc between the servo disc and the mounting plate 22. The driver lever 73 carries a pin 75 on its arm 74, which pin engages the groove 71 with a slight clearance. In this way a rotation of the servo disc 52 cause the lever 73 to pivot about the spindle 72. The free end portion 76 of the arm 74 of the drive lever 73 is hook-shaped and serves to transmit the force for moving the support 37. The end portion of the other arm 77 of the drive lever 73 carries a further pin 78 which serves for moving the head-mounting plate/slide 32.

Since the servo mechanism 50 is rendered operative upon actuation of any of the push-buttons 9, 10, 11, the head-mounting plate/slide 32 is shifted away from the cassette 24 in the direction indicated by the double-headed arrow 31 against the force of a return spring, not shown, through the pin 78 on the drive lever 73 in each mode thus selected, causing the head-mounting plate, not shown, to be so positioned that the magnetic heads and the pressure roller arranged on said plate are lifted off the magnetic tape. Thus, the head-mounting plate/slide 32 constitutes an apparatus part which is positioned in the same way in each of the modes of operation which can be selected by means of the push-buttons 9, 10 and 11.

As already described, the support 37 constitutes an apparatus part which is set to different positions depending on the selected mode of operation. In the "fast foward" mode the support 37 is set to one of its two operating positions and in the "fast reverese" mode it is set to the other of its two operating positions, whilst in the "pause" mode the support 37 remains in its rest position. In order to achieve this a force transmission which is controlled in conformity with the selected mode of operation is provided between the drive member of the servo mechanism, that is, the drive lever 73, and the apparatus part to be set in conformity with the selected mode, that is the support 37, enabling the actuating forces transmitted by the hook-shaped free end portion 76 of the drive lever 73 to be converted into different actuating forces for the support 37. For this purpose the apparatus 1 comprises a shift lever 79 which is arranged opposite the upper radial surface of the servo disc 52 between this disc and the mounting plate 22, which is guided so as to be movable parallel to the mounting plate, and which has a slot 80 through which a pin 81 arranged on the mounting plate 22 extends, which pin constitutes a pivot for the shift lever 79. One edge 82 of the shift lever 79 is urged against the spindle 51 of the servo disc 52 under the influence of a fourth wire spring 83 which acts between this shift lever and the mounting plate 22. Thus, the fourth wire spring 83 urges the shift lever 79 in the direction indicated by the arrow 84. At the location of its free end which is situated near the servo disc 52 the shift lever has an angular portion 85 which constitutes an actuating member of the servo mechanism 50 which can be set to various positions between the drive lever 73 and the support 37 defined by the stops 20, 21 and 23 associated with the push-buttons 9, 10 and 11, in order to provide a force transmission between the drive lever 73 and the support 37 in conformity with the selected mode of operation. By means of this angular portion 85 of the shift lever 79 the forces transmitted by the drive lever 73 are converted into different actuating forces for the support 37, as will be described in detail hereinafter.

In order to set the actuating member constituted by the angular portion 85 of the shift lever 79 to its various positions, there is provided a control device 86 which can be rendered operative by actuation of the push buttons 9, 10 and 11. This control device comprises a second eccentric means which can be driven by a motor and which is constituted by a cam 87 which projects radially from the circumference of an axially projecting disc-shaped circularly cylindrical portion 88 on the upper radial surface of the servo disc 52. At the deck side this portion 88 is formed with an endless groove 71 constituting the first eccentric means. Thus, in a particularly simple and compact manner both the first eccentric means constituted by the groove 71 and the second eccentric means constituted by the cam 87 are arranged on the servo wheel 52 and can be driven thereby. The groove 71 and the cam 87 are situated on the same radial surface of the servo disc, namely on the upper surface which faces the mounting plate, at substantially the same level, which is advantageous in order to minimize the height.

Further, the control device 86 comprises three scanning elements for scanning the stops 20, 21 and 23, which elements cooperate with the second eccentric means constituted by the cam 87 and with the actuating member constituted by the angular portion 85 of the shift lever. The scanning elements are constituted by three tabs 89, 90 and 91 which project laterally from the shift lever 79 towards the stops 20, 21 and 23 and which are situated near the end of this shift lever which is remote from the angular portion 85, the tab 89 being intended to cooperate with the stop slide 21, the tab 90 with the stop slide 20 and the tab 91 with the stop block 23. In the present case the three scanning elements constituted by the tabs 89, 90 and 91 of the shift lever and the actuating member constituted by the angular portion 85 of the shift lever 79 are interconnected via the actual shift lever, so that they are not only force-coupled but also form-coupled, which results in a simple and stable construction. The scanning elements constituted by the tabs can be released by the cam 87 to scan the stops. For this purpose the shift lever 79 comprises a further pin 92, if the servo disc 52 is in its rest position, acts against the cam 87 under the influence of the fourth wire spring 83 which acts upon the shift lever. When the servo disc is rotated clockwise upon actuation of a push-button, the cam 87 releases the pin 92, so that the shift lever 79 is moved in the direction indicated by the arrow 84 under the influence of the fourth wire spring 83 until the relevant tab of the shift lever abuts with the stop associated with the actuated push-button and defining the selected mode of operation. In this way, depending on the actuated push-button and the mode of operation thus selected the stops 20, 21 and 23 of the tabs 89, 90 and 91 which function as scanning elements enable the shift lever 79 and hence its angular portion 85 which functions as actuating member to be moved from the rest position shown in FIG. 2 to three different positions. Since each stop 20, 21 and 23 is associated with a separate tab 89, 90 and 91 respectively, an appropriate choice of the positions of the tabs on the shift lever 79 enables the three positions of the shift lever to be adapted simply to a specific construction, for example to the detection positions of the stops 20, 21 and 23, or to the positions of the angular portion 85 of the shift lever for the appropriate force transmission between the drive lever 73 and the support 37.

The shift lever 79 occupies the first position when the "fast reverse" mode has been selected with the push-button 10, the stop slide 21 then being moved into the path of movement of the tab 89. After it has been released by the cam 87 the shift lever 79 is then shifted only over a very small distance in the direction indicated by the arrow 84 by the fourth wire spring 83, that is, it remains substantially in the same position as in FIG. 2, the hook-shaped end portion 76 of the drive lever 73 then being situated opposite a first notch 93 in the angular portion 85 of the shift lever 79 and a first actuating surface 94 on the angular portion 85 being situated opposite the free end portion 45 of the actuating arm 44 of the support 37. In the first position of the shift lever 79 the first actuating surface 94 exerts an actuating force on the actuating arm 44 of the support 37, which force is directed as indicated by the arrow 46, so that said support is set to the operating position for the "fast reverse" mode, as already described in detail in the foregoing.

The shift lever 79 occupies the second position if the "fast forward" mode is selected with the push-button 9, the stop slide 20 then being moved into the path of movement of the tap 90. After the shift lever 79 has been released by the cam 87 the fourth wire spring 83 shifts the shift lever in the direction indicated by the arrow 84 until the hook-shaped end portion 76 of the drive lever 73 is situated opposite a second notch 95 in the angular portion 85 of the shift lever 79 and a second actuating surface 96 on the angular portion, which surface is inclined relative to the first actuating surface 94, is situated opposite the free end portion of the actuating arm 44 of the support. In the second position of the shift lever 79 the second actuating surface 96 exerts an actuating force which is directed as indicated by the arrow 48 on the actuating arm 44 of the support, so that this support is set to the "fast forward" mode shown in FIG. 4 and described in detail in the foregoing.

The shift lever occupies the third position if the "pause" mode is selected with the button 11, the stationary stop block 23 then being situated in the path of movement of the tap 91. After the shift lever 79 has been released by the cam 87 the fourth wire spring 83 shifts this shift lever in the direction indicated by the arrow 84 until the angular portion 85 of the shift lever is situated outside the path of movement of the hook-shaped free end portion 76 of the drive lever 73, so that in this third position of the shift lever the drive lever no longer exerts an actuating force on the shfit lever and the support remains in the rest position shown in FIG. 2.

Hereinafter a sequence of operations as occurs when the "fast forward" mode is selected will be described with reference to FIGS. 2, 3 and 4. For selecting the "fast forward" mode push-button 9 is actuated. As a result of this, the stop slide 20 is shifted into the detection position shown in FIGS. 3 and 4 and is retained in this position through the coupling 17 and the latching lever 60 is pivoted from its first latching position shown in FIG. 2 into its second latching position shown in FIGS. 3 and 4 and is retained in this position through the coupling 65. As soon as the free end portion 63 of the latching lever 60 releases the first latching stop 57, the third wire spring 70 imparts a mechanical impulse to the servo disc 52 through the pin 69, so that the servo disc, which was in its rest position, is rotated clockwise. The cam 87 then releases the pin 92 on the shift lever 79, so that the tab 90, which functions as the scanning element for the stop slide 20, is disengaged through the shift lever 79. Subsequently, the fourth wire spring 83 moves the shift lever in the direction indicated by the arrow 84 until the tab 90 is urged against the stop slide 20, so that the tab 90, which is positioned against the slide 20, moves the shift lever 79 and consequently the angular portion 85 which functions as the actuating member into said second position in which the second notch 95 in the angular portion 85 is situated opposite the hook-shaped end portion 76 of the drive lever 73 and the second actuating surface 96 on the angular portion 85 is situated opposite the free end portion 45 of the actuating arm 44 of the support 37, as is shown in FIG. 3. Since the third wire spring 70 causes the servo disc 52 to rotate, the switching cam 67 of the servo disc is moved away from the switch 68, so that the switch 68 is closed and the motor 27 is connected to the supply voltage V in order to drive the capstan 29 and consequently the parts which are connected thereto, namely the flywheel 30, the gear wheel 33 and the pinion 55. Further, as a result of the rotation of the servo disc 52 by means of the third wire spring 70 the toothed portion 53 of the servo disc 52 meshes with the pinion 55 which is already driven by the motor 27. During the cycle of operations described so far, the groove 71 exerts no actuating forces on the drive lever 73 because of the shape of this groove. This has the advantage that the spring force to be exerted by the first spring in order to rotate the servo disc can be comparatively small.

As soon as the toothed portion 53 meshes with the pinion 55 the servo disc 52 will be driven by the motor 27 whose power supply V is connected through the closed switch 68, as can be seen in FIG. 3. As the servo wheel 52 is rotated further, the drive lever 73 is pivoted clockwise by the servo disc via the pin 75 because of the shape of the groove 71. The further pin 78 on the arm 77 of the shift lever 73 then moves the head-mounting plate/slide 32 against the force of the return spring, not shown, so that the head-mounting palte is moved in such a direction that the magnetic heads and the pressure roller are lifted off the magnetic tape and the hook-shaped free end portion 76 of the arm 74 of the drive lever 73 engages the second notch 95 in the angular portion 85 of the shift lever 79 as a result of which the shift lever 79 cannot be moved in the longitudinal direction because of the force exerted on it by the fourth wire spring 83, and the shift lever 79 is pivoted about the pin 81, the second actuating surface 96 on the angular portion 85 of the shift lever abutting with the free end portion 45 of the actuating arm 44 of the support 37 and thereby setting the support to the operating position shown in FIG. 4 against the force of the first wire spring 43 which acts on said support. The required actuating forces are now provided by the motor 27.

The apparatus parts to be positioned by means of the servo mechanism 50, namely the head-mounting plate/actuating slide 32 and the support 37, are then already in their operating positions. However, the servo disc 52 is rotated further by the motor 27, the pinion 55 on the capstan 29 again being disengaged from the toothed portion 53, as can be seen in FIG. 4. As soon as the pinion 55 has disengaged from the toothed portion 53, the servo disc 52 is rotated slightly further by the third wire spring 70 through the pin 69, until the second latching stop 58 abuts with the angular end portion 63 of the latching lever 60, which is retained in its second latching position through the coupling 65. The servo disc 52 is then in its operating position in which it is retained by the third spring 70 and in which, through its groove 71, the pin 75 and the drive lever 73, it retains the apparatus parts in their operating positions against the forces exerted by the associated springs. In this respect it is effective if, at the location where the pin 75 is situated when the servo disc is in its operating position, the groove has such a shape that a large force ratio is obtained enabling the comparatively large reactive forces which are exerted on the drive lever, by the apparatus parts which are moved against the force of the springs, to be taken up with a comparatively small spring force of the third spring which retains the servo disc in its operating position. In the situation shown in FIG. 4 the apparatus has been set to the "fast forward" mode, in which the magnetic tape is wound onto the magnetic tape reel which is driven by the winding spindle 5, the winding spindle 5 being driven by the motor 27. Thus, in the present apparatus, the motor 27 not only delivers the power for driving the servo mechanism 50 but also the power for driving the capstan 29 and the winding spindles 4 and 5.

In order to switch off the previously selected "fast forward" mode the push-button 9 is reset from its on-position to its off-position, which is achieved by releasing the latching device which keeps the push-button 9 in its actuated position; this is possible, for example by actuating another push-button. As soon as the push-button has returned to its off-position, the stop slide 20 is returned to its rest position shown in FIG. 2 through the coupling 17 and the latching lever 60 is returned to its first latching position shown in FIG. 2 through the coupling 65 under the influence of the second wire spring 62. As a result of this, the servo disc 52 is no longer retained in its operating position and it is rotated further from its operating position shown in FIG. 4 to its rest position shown in FIG. 2 by the third wire spring 70 through the pin 69. During this rotation of the servo disc the drive lever 73 is reset to the rest position shown in FIG. 2 through the groove 71 and the pin 75, the head-mounting plate/slide 32 being also reset under the influence of the return spring, not shown, and the support 37 and the shift lever 79 being also reset under the influence of the first wire spring 43 which acts on the support. The first wire spring 43 and the return spring, now shown, for the head-mounting plate/actuating slide then assist in rotating the servo disc 52 from its operating position to its rest position through the drive lever 73. Towards the end of this rotation of the servo disc the cam 87 abuts with the pin 92 on the shift lever 79, so that this lever is set to the rest position shown in FIG. 2 in a direction opposite to that indicated by the arrow 84 against the force exerted by the fourth wire spring 83. Finally, the servo disc 52 is stopped in that the first latching stop 57 abuts with the angular free end portion 63 of the latching lever 60 which is in its first latching position. Then the servo disc as well as the other apparatus parts again occupy their rest positions in which the cam 77 keeps the switch 68 open, so that the motor 27 is switched off.

As will be apparent from the foregoing description, the cam, which through the shift lever releases the scanning elements to scan the stops associated with the push-buttons, and the groove for positioning the drive lever, and consequently the support for the gear-wheel pair and the head-mounting plate/actuating slide, are arranged on the servo disc and can be driven by this disc so that a particularly simple and compact construction is obtained. The groove and the cam are formed on the same radial surface of the servo disc and the drive lever and the shift lever are arranged directly opposite this surface, so that a particularly small mounting height is obtained. As can be seen, the servo mechanism and the control device comprise only two levers, so that the servo mechanism and the control device operate smoothly and the forces to which the servo disc is objected are minimal. The use of the two eccentric means, namely the groove and the cam on the servo disc, ensures that the sequence of movements controlled by the two eccentric means is always coordinated very accurately.

What is claimed is:

1. A magnetic-tape apparatus comprising:
at least two manually-operable push-butons for selecting modes of operation of the apparatus,
a respective stop associated with each button for defining the mode of operation selected by actuation of the respective button,
at least one apparatus part arranged to be positioned in conformity with the selected mode, and
a servo mechanism which operates responsive to actuation of a button for positioning the apparatus part, said servo mechanism comprising
a motor,
a servo disc arranged to be driven by the motor for rotation upon actuation of a button, and having a first eccentric means arranged on the disc, a drive member arranged to be movable by said eccentric means,
an actuating member arranged to position the apparatus part, said actuating member being movable by the drive member to different positions defined by said stops, and
a control device comprising a second eccentric means arranged to be driven by said motor; at least one scanning element for scanning said stops, said scanning element arranged to cooperate with the second eccentric means and the actuating member, and to be released by said second eccentric means to scan the stops; and a spring arranged to bias said scanning element against a stop corresponding to the selected mode so as to scan said stop,
said servo mechanism being so arranged that actuation of a button first causes the second eccentric means to release the scanning element in order to scan the stops, said spring moving the actuating member to the position defined by the stop corresponding to the selected mode, and urging the scanning element against that stop; and said first eccentric means then moves said drive member so as to cause said drive member to move the actuating member, and the actuating member to position the apparatus part,
characterized in that said servo disc has a radial surface carrying a disc-shaped axially projecting portion having an endless groove formed in one side of said disc, and having a circumferential cam; and in that said endless groove constitutes the first eccentric means, and the circumferential cam constitutes the second eccentric means.

2. An apparatus as claimed in claim 1, characterized in that said drive member is a pivotable drive lever having a projection arranged to engage said groove,
the apparatus further comprises a translatable and pivotable shift lever having a further projection, and a spring arranged to bias said shift lever such that said further projection engages said cam, and
said shift lever includes at least one laterally projecting tab which constitutes the scanning element for scanning the stops, and a portion which constitutes the actuating member.

3. An apparatus as claimed in claim 2, characterized in that said shift lever comprises a separate laterally projecting tab for scanning each respective stop.

* * * * *